United States Patent [19]

Yates et al.

[11] Patent Number: 4,903,484
[45] Date of Patent: Feb. 27, 1990

[54] EXHAUST DISSIPATOR AND DEFLECTOR

[76] Inventors: Clyde I. Yates, 7765 S. Erie Ave., Tulsa, Okla. 74136; Robert W. Krah, 9433 S. 67th E. Ave., Tulsa, Okla. 74133

[21] Appl. No.: 350,145

[22] Filed: May 8, 1989

[51] Int. Cl.$^4$ .................. F02B 35/00; F01N 7/00
[52] U.S. Cl. ........................... 60/316; 60/324
[58] Field of Search ................ 60/316, 319, 324

[56] References Cited

U.S. PATENT DOCUMENTS

| 2,984,967 | 5/1961 | Caddell | 60/316 |
| 3,788,072 | 1/1974 | Burger | 60/324 |
| 4,205,706 | 6/1980 | Jasensky | 60/324 |
| 4,665,691 | 5/1987 | Eller | 60/316 |

FOREIGN PATENT DOCUMENTS 349955  7/1937  Italy .................. 60/316

Primary Examiner—Douglas Hart
Attorney, Agent, or Firm—Head & Johnson

[57] ABSTRACT

An exhaust gas deflector for the top of a vertical tubular truck exhaust stack, the deflector being formed of a generally horizontal base plate having an opening therethrough, a vertical tubular pipe portion secured to the base plate coincident with the opening therein, the lower end of the tubular pipe portion being attached to the top of the truck exhaust stack, a pair of spaced apart side panels affixed to the base plate, an air scoop plate affixed to the front edge of the base plate and the side edges thereof affixed to the side panels, the air scoop plate being inclined downwardly and an upwardly inclined deflector plate affixed to the base plate rear edge and the side edges thereof being affixed to the side panels, so that as the truck having the exhaust gas deflector thereon moves, air passes through the deflector and is comingled with the exhaust gas which is deflected in an upward direction.

8 Claims, 2 Drawing Sheets

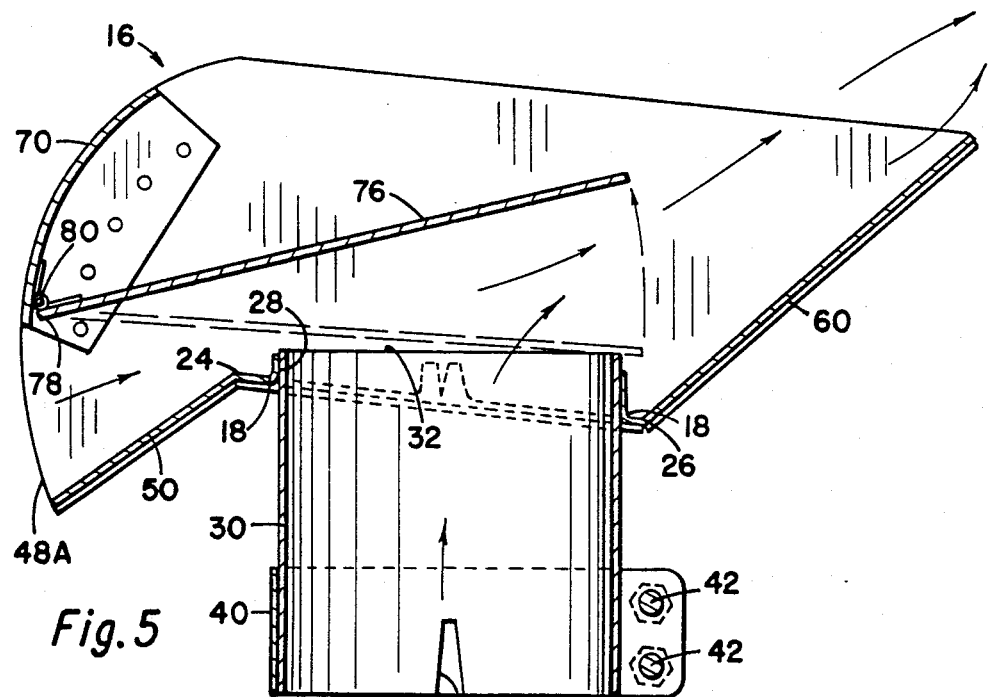
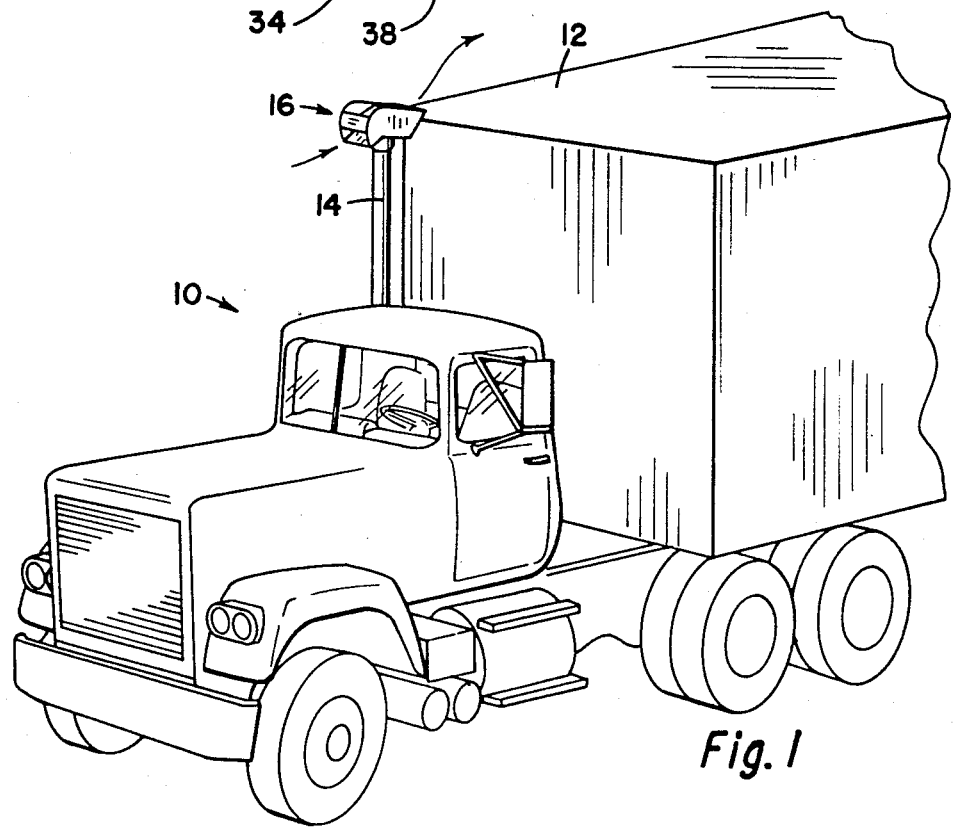

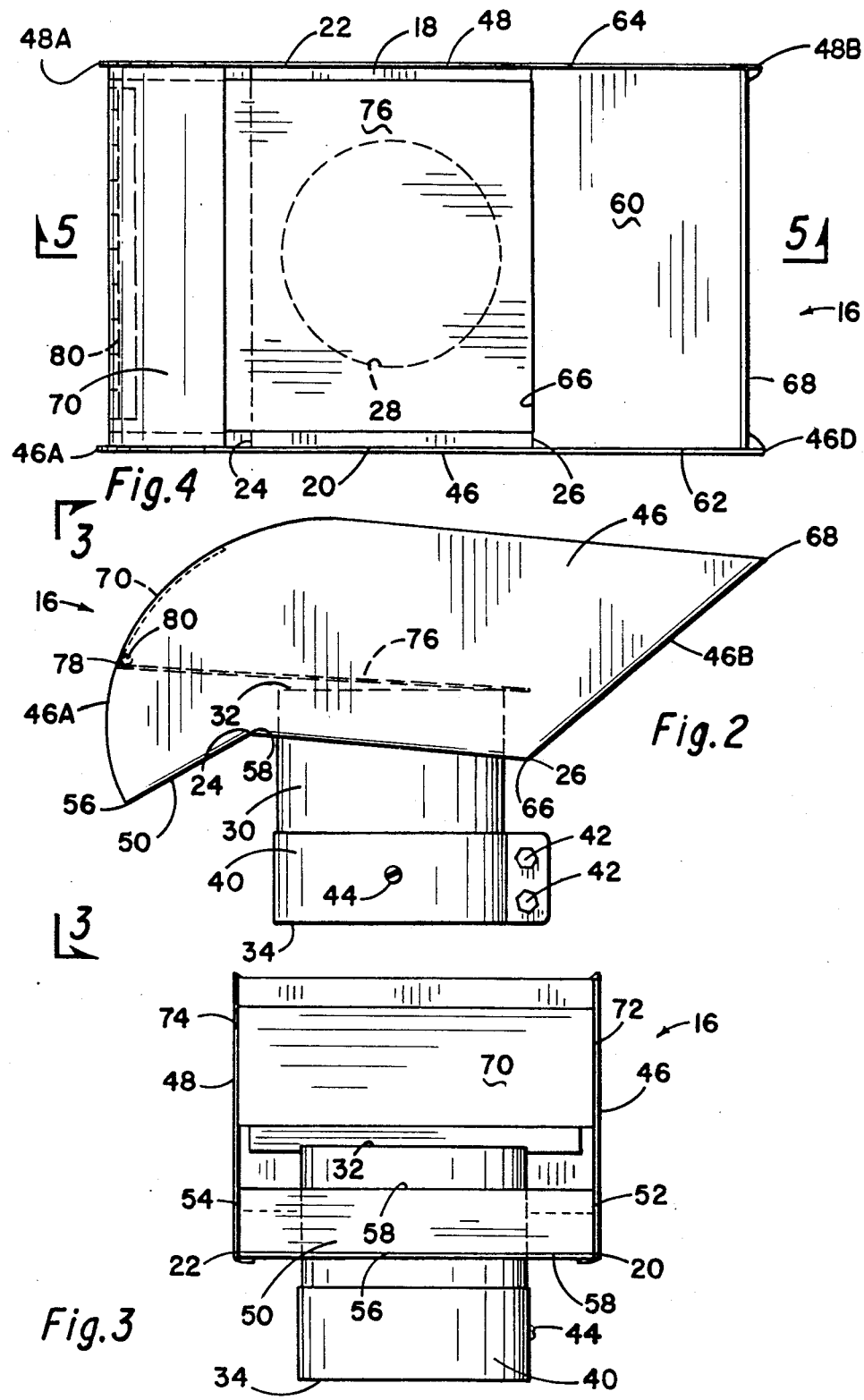

EXHAUST DISSIPATOR AND DEFLECTOR

SUMMARY OF THE INVENTION

Most large trucks in use in the United States and in other parts of the world today use diesel oil as the primary fuel. While diesel oil is a very satisfactory fuel, it produces smoke as a result of combusion in the engine. The exhaust gases of the truck engine are typically directed upwardly by a vertical exhaust stack extending from the truck. Since the maximum height of trucks is limited by bridges and overpasses through which the truck must travel on highways, the type of exhaust stack typically is substantially equal with or very little higher than the top of the truck or the trailer portion pulled by the truck. With an open top vertical exhaust stack, the exhaust gases are moved generally horizontally as the truck moves through the air at typical driving speeds. Gases from the exhaust stack frequently impinges upon the trailer portion of the truck, causing the trailer portion to become blacken and unsightly.

The present disclosure is directed towards a device for attachment to the top of a truck exhaust stack. The device accomplishes three basic objectives. First, the device functions to deflect the exhaust gas upwardly to thereby reduce impingement of the exhaust gases on the truck trailer portion. Second, the device creates a slight pressure reduction in the top end of the truck exhaust stack, thereby reducing the exhaust back pressure on the truck engine. Third, in the preferred embodiment, the device provides a rain shield to prevent rain or snow from entering the truck exhaust stack.

The exhaust gas deflector of this disclosure is formed of a generally horizontal base plate having opposed side edges, a front edge and an opposed rear edge. The base plate has an opening through it spaced between the side edges and the front and rear edges.

A vertical tubular pipe portion has an upper and a lower end, and is secured to the base plate coincident with the opening in the base plate. The lower end of the vertical tubular pipe portion has means for attachment to the top of a truck vertical exhaust stack. This typically is achieved by providing slits in the lower end of the vertical tubular pipe portion so that the internal diameter thereof may be varied. Around the exterior of the pipe portion a circumferential band is provided having ends which are spaced apart. When the vertical tubular portion is positioned on a truck exhaust stack, a bolt extending between the ends of the band is tightened, thereby reducing the interior circumferential diameter of the tubular pipe portion to secure it to the upper end of the truck exhaust stack.

The exhaust gas deflector further is formed by a pair of spaced apart side panels, one being affixed to each of the base plate side edges, the side panels extending vertically and each having a forward and a rearward end.

An air scoop plate has opposed side edges, a front edge and an opposed rear edge. The air scoop rear edge is affixed to the base plate front edge and the side edges are affixed to the side panels. The air scoop plate is inclined downwardly from the rear edge to the front edge.

A deflector plate has opposed side edges, a front edge and a rear edge and has the front edge affixed to the base plate rear edge. The side edges are affixed to the side panels. The deflector plate is inclined upwardly from the front edge to the rear edge. A spacer member having opposed ends is affixed to the side panels. The spacer member is placed above the air scoop plate and in the preferred arrangement, the spacer member is curved to conform to the curved forward end of the side plates.

The exhaust gas deflector serves to direct air upwardly by the combined effect of the sloped air scoop and deflector plates, the air moving between the side panels. This upwardly deflected air carries with it exhaust gas passing from the truck exhaust stack through the tubular portion so that the exhaust gas and air mixed therewith are deflected upwardly to thereby reduce impingement of the exhaust gas on the truck trailer portion.

In a further preferred arrangement, a rain cover is employed in conjunction with the truck exhaust gas deflector. The cover is in the form of a plate which is pivotably supported to the deflector between the side plates. In the non-actuated position, the plate extends over the top of the tubular pipe portion to thereby prevent rain or snow from entering the tubular pipe portion and thereby entering into the truck exhaust stack. In the actuated position the cover plate is pivoted upwardly by the exhaust passing from the tubular pipe portion. The cover plate is preferably pivoted to the spacer member which extends between the side plates.

As previously indicated, the exhaust gas deflector serves the three functions of (1) upwardly directing exhaust gas to reduce impingement on the trailer portion of a truck as the truck moves at highway speeds, (2) serves to apply a small vacuum effect to the exhaust stack to reduce the exhaust back pressure, and (3) serves to prevent rain, snow and other contaminants entering into the truck exhaust stack.

The invention will be better understood with reference to the following description and claims, taken in conjunction with the attached drawings.

DESCRIPTION OF THE DRAWINGS

FIG. 1 is an isometric view of a typical truck and trailer combination, the truck having a vertical exhaust stack, and having the exhaust gas deflector affixed to the upper end thereof.

FIG. 2 is an elevational side view of the exhaust gas deflector of this invention shown in a preferred embodiment.

FIG. 3 is a front view of the exhaust gas deflector taken along the line 3—3 of FIG. 2.

FIG. 4 is a top view of the exhaust gas deflector of this invention.

FIG. 5 is a cross-sectional view taken along the line of 5—5 of FIG. 4.

DESCRIPTION OF THE PREFERRED EMBODIMENT

Referring to the drawings and first to FIG. 1, the environment in which the invention is used is illustrated. A truck is generally indicated by the numeral 10 having a trailer portion 12. The truck has a vertical exhaust stack 14 by which the products of combustion of the engine are exhausted to the atmosphere. Typically, the exhaust stack of the truck extends as high as possible into the air but because of height limitations, the top of the exhaust stack 14 cannot usually be significantly higher than the top of the truck trailer portion 12. For this reason, exhaust gases, which include all of the products of combustion of fuel, which is typically diesel fuel, frequently impinge upon the truck trailer portion 12 and cause it to become blacken or otherwise soiled and displeasing in appearance. To improve the discharge of gases from the exhaust stack 14, this disclosure provides a truck exhaust gas deflector generally indicated by the numeral 16, which will now be more fully and completely described with reference to FIGS. 2–5.

The preferred embodiment of the exhaust gas deflector is formed of a generally horizontal base plate 18. The base plate is described as "generally horizontal", although in the preferred embodiment, as illustrated, the plate slightly departs from the horizontal. The base plate has opposed side edges 20 and 22, a front edge 24 and a rear edge 26. Further, the base plate has a cylindrical opening 28 therein which is spaced from the front and rear edges 24 and 26, and the side edges 20 and 22.

The second basic portion of the exhaust gas deflector 16 is a vertical tubular pipe portion 30 having an upper end 32 and a lower end 34. The base plate circumferential opening 28 is received on the exterior of the vertical tubular pipe portion 30 and secured to it. This may be accomplished by providing integral flange portions formed as a part of the base plate surrounding the circumferential opening 28, as shown in FIG. 5.

A means is provided for affixing the vertical tubular piping portion 30 to the upper end of the truck exhaust stack 14. This is accomplished, in one manner, by providing slits 38 in the tubular pipe portion adjacent the lower end 34. These slits 38 allow the internal circumferential diameter of the pipe portion to be varied. Surrounding the pipe portion adjacent the lower end 34 is a band 40. The ends of the band 40 are spaced apart and the ends can be drawn towards each other by means of bolts 42 in the usual way of that of a hose clamp. By tightening the bolts 42, the lower end of the tubular pipe portion 30 can be reduced so as to clamp it to the upper end of the truck exhaust stack 14.

A threaded hole is provided in the band 40 and through the tubular pipe portion 30. The threaded hole receives a screw 44 to lock the tubular pipe portion 30 in place onto the top on the exhaust stack 14 and prevents the rotation of the exhaust gas deflector.

Affixed to the base plate side edge 20 is a first vertical side panel 46, and in like manner, affixed to edge 22 is a second vertical side panel 48. The side panels 46 and 48 thus are parallel to and spaced apart from each other. Side panel 46 has a forward end 46A and a rearward end 46B and in like manner, side panel 48 has a forward end 48A and a rearward end 48B. In the preferred arrangement, the forward end of each of the side panels is arcuate, as best seen in FIGS. 2 and 5, and the rearward ends are inclined upwardly.

An air scoop plate 50 has opposed side edges 52 and 54, a front edge 56 and a rear edge 58. The air scoop plate side edges 52 and 54 are affixed to the vertical side panels 46 and 48 respectively. The side plate rear edge 58 joins the base plate front edge 24. The air scoop plate 50 is inclined downwardly from the rear to the front edge to impart an upward direction to air passing thereover.

A deflector plate 60 has opposed side edges 62 and 64 which are affixed to the side panels 46 and 48 respectively at the side panels rear edges 46B and 48B. The deflector plate 60 also has a front edge 66 and a rear edge 68. The front edge 66 is affixed to the base plate rear edge 26. The deflector plate 60 is inclined upwardly from the front edge 66 to the rearward 68 and serves to deflect exhaust gases upwardly as the exhaust gas deflector moves through the air.

A spacer member 70 has a first end 72 affixed to the first vertical side plate 46 and a second end 74 affixed to the second vertical side plate 48. In the preferred arrangement, the spacer member 70 is arcuately configured in planes perpendicular to the length thereof to coincide with the arcuate shape of the side plate forward edges 46A and 48A. The spacer member 70 is positioned above the deflector air scoop 50 to provide a space therebetween which functions as an inlet opening into the generally horizontal body portion formed by the side panels 46 and 48.

A rain cover plate 76 is received between the vertical side panels 46 and 48. The rain cover, which can be in the form of a flat plate as illustrated, has a forward edge 78. A hinge 80 is affixed to the rain cover 76 adjacent the forward edge 78 and to the spacer member 70. In its non-deflected position, as illustrated in FIG. 2 and in dotted outline in FIG. 5, the rain cover 76 extends over the upper open end 32 of the vertical tubular pipe portion 30 to thereby prevent rain or snow from entering into the interior of the tubular portion 30 and into the interior of the truck exhaust stack 14.

With the exhaust gas deflector in place on the top of a truck exhaust stack 14 and the truck moving at typically highway speeds, air passes through the deflector by passing between the air scoop plate 50 and the spacer member 70. The air passes upwardly, lifting the rain cover 76. The air mixes with the exhaust passing out of the exhaust stack 14 and through the vertical tubular pipe portion 30. The mixed air and exhaust then pass out from between the side panels 46 and 48 and is further deflected upwardly by deflector plate 60. Thus, both the air scoop plate 50 and the deflector plate 60 serve to impart an upward direction to air passing through the deflector. This action directs the mixed air and exhaust gas in an upward direction so that less of the exhaust gas tends to impinge upon the truck trailer portion 12.

Further, it is believed, and limited experiments have indicated, that this upward flow of air tends to create a slight reduction in pressure at the top of stack 14 to thereby slightly reduce the exhaust gas back pressure on the truck engine, although actual measurements of the exhaust pressure at the top of the truck exhaust stack have not been made.

The aerodynamic effect of spacer member 70 further helps reduce the air pressure within the deflector between the side panels 46 and 48 by directing air upwardly above the upper ends of the side panels. Further, the aerodynamic effect of the spacer member 70 provides lifting action for the rain cover 76 to ensure that the rain cover does not restrict escape of exhaust gases from the tubular pipe portion 30.

The exhaust gas deflector described provides an improved means for deflecting exhaust gases upwardly to reduce the deposit of residue on truck trailer portions, to slightly reduce the back pressure on the truck exhaust and to shield the truck exhaust stack against the entrance of rain and snow.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An exhaust gas deflector for the top of a vertical truck exhaust stack, comprising:
    a vertical tubular portion having an upper and a lower end;
    means to attach said tubular portion lower end to the top of a truck exhaust stack;
    a generally horizontal body portion affixed to said tubular portion at the upper end thereof and having a forward and a rearward end and a passageway therethrough, and having an opening therein communicating the passageway with said tubular portion;
    an intake portion at the forward end of said body portion and having a passageway therethrough, the passageway being inclined upwardly towards said body portion and communicating with the body portion passageway; and
    an outlet portion at the rearward end of said body portion and having a passageway therethrough, the passageway being inclined upwardly away from said body portion and communicating with the body portion.

2. An exhaust gas deflector according to claim 1 wherein said body portion has a top and bottom, the bottom being affixed to said tubular portion and having said opening therein, and said top being open.

3. An exhaust gas deflector for the top of a vertical tubular truck exhaust stack, comprising:
    a generally horizontal base plate having opposed side edges, a front edge and an opposed rear edge and having an opening therethrough spaced between the side edges and the front and rear edges;
    a vertical tubular pipe portion having an upper end and a lower end, the pipe portion being secured to said base plate coincident with said opening therein;
    means to attach the pipe portion lower end to the top of a truck vertical exhaust stack;
    a pair of spaced apart side panels, one being affixed to each of said base plate side edges, each panel having a forward and a rearward end;
    an air scoop plate having opposed side edges, a front edge and an opposed rear edge, the rear edge being affixed to said base plate front edge and the side edges being affixed to said side panels, the air scoop plate being inclined downwardly from said rear edge to said front edge; and
    a deflector plate having opposed side edges, a front edge and an opposed rear edge, the front edge being affixed to said base plate rear edge and the side edges being affixed to said side panels, the deflector plate being inclined upwardly from said front edge to said rear edge.

4. An exhaust gas deflector for the top of a vertical tubular truck exhaust stack according to claim 3 including;
    a spacer member having opposed ends affixed to said side panels and spaced from said air scoop plate.

5. An exhaust gas deflector for the top of a vertical tubular truck exhaust according to claim 4 wherein each of said side plates has an upper and a lower edge, wherein said base plate, said air scoop plate and said deflector plate are affixed to said side plates adjacent the lower edge thereof, and wherein the side plates upper edge adjacent the forward end is curved downwardly to said air scoop forward edge and wherein said spacer is affixed to said side plates adjacent the upper and forward edges thereof.

6. An exhaust gas deflector for the top of a vertical tubular truck exhaust according to claim 5 wherein said spacer is curved in planes perpendicular to the length thereof between said opposed ends and wherein the curved shape is substantially coincident with said curved upper edge of each of said side plates.

7. An exhaust gas deflector for the top of a vertical tubular truck exhaust according to claim 3 including:
    rain cover means pivotally supported relative to said base plate, the rain cover means extending in the nonactuated position to generally cover said tubular pipe portion upper end and pivoting upwardly in response to exhaust passing through said pipe portion.

8. An exhaust gas deflector for the top of a vertical tubular truck exhaust according to claim 4 including;
    rain cover means pivotally supported to said spacer member, the rain cover means extending in the non-actuated position to generally cover said tubular pipe portion upper end and pivoting upwardly in response to exhaust passing through said pipe section.

* * * * *